US010365171B2

(12) United States Patent
Kaneko et al.

(10) Patent No.: US 10,365,171 B2
(45) Date of Patent: Jul. 30, 2019

(54) CAPACITIVE SENSOR SHEET AND CAPACITIVE SENSOR FOR MEASURING ELASTIC DEFORMATION

(71) Applicant: BANDO CHEMICAL INDUSTRIES, LTD., Kobe-shi, Hyogo (JP)

(72) Inventors: Katsuhiro Kaneko, Hyogo (JP); Hideo Otaka, Hyogo (JP)

(73) Assignee: BANDO CHEMICAL INDUSTRIES, LTD., Kobe-shi, Hyogo (JP)

( * ) Notice: Subject to any disclaimer, the term of this patent is extended or adjusted under 35 U.S.C. 154(b) by 266 days.

(21) Appl. No.: 14/868,258

(22) Filed: Sep. 28, 2015

(65) Prior Publication Data
US 2016/0018275 A1 Jan. 21, 2016

Related U.S. Application Data

(63) Continuation of application No. PCT/JP2014/059143, filed on Mar. 28, 2014.

(30) Foreign Application Priority Data

Mar. 29, 2013 (JP) .................................. 2013-074030

(51) Int. Cl.
*G01L 1/00* (2006.01)
*G01L 1/14* (2006.01)
(Continued)

(52) U.S. Cl.
CPC ................ *G01L 1/146* (2013.01); *G01B 1/00* (2013.01); *G01B 7/22* (2013.01); *G01B 7/28* (2013.01)

(58) Field of Classification Search
CPC ... G01L 11/025; G01L 1/146; G01D 5/35338; G01D 5/35351; B32B 3/08; B32B 2307/42; G01B 1/00; G01B 7/22; G01B 7/28
(Continued)

(56) References Cited

U.S. PATENT DOCUMENTS 5,693,886 A 12/1997 Seimiya et al.
2010/0033196 A1 2/2010 Hayakawa et al.
(Continued)

FOREIGN PATENT DOCUMENTS

JP 2003-282983 A 10/2003
JP 2005-223025 A 8/2005
(Continued)

OTHER PUBLICATIONS

Third Party Observation issued in corresponding International Application No. PCT/JP2014/059143 dated Apr. 21, 2015 (7 pages).
(Continued)

Primary Examiner — Max H Noori
(74) Attorney, Agent, or Firm — Osha Liang LLP

(57) ABSTRACT

Provided is a capacitive sensor sheet for use in measuring at least one of an amount of strain due to elastic deformation and a distribution of strain due to elastic deformation, and the capacitive sensor sheet comprises: a dielectric layer; a top electrode layer laminated on the obverse surface of the dielectric layer; and a bottom electrode layer laminated on the reverse surface of the dielectric layer, wherein the dielectric layer is composed of an elastomer composition containing a urethane elastomer, and each of the top electrode layer and the bottom electrode layer is composed of an electroconductive composition containing carbon nanotubes.

10 Claims, 12 Drawing Sheets

(51) Int. Cl.
*G01B 7/28* (2006.01)
*G01B 1/00* (2006.01)
*G01B 7/16* (2006.01)

(58) Field of Classification Search
USPC .......................................... 73/705, 862.626
See application file for complete search history.

(56) References Cited

U.S. PATENT DOCUMENTS

| | | |
|---|---|---|
| 2011/0006787 A1 | 1/2011 | Kadono |
| 2011/0051775 A1* | 3/2011 | Ivanov et al. ......... B82Y 30/00 374/143 |
| 2011/0187238 A1 | 8/2011 | Jost |
| 2012/0025803 A1 | 2/2012 | Kato et al. |
| 2012/0272751 A1* | 11/2012 | Gorjanc et al. ......... G01L 1/146 73/862.046 |
| 2013/0082763 A1 | 4/2013 | Inada et al. |
| 2013/0181727 A1 | 7/2013 | Nishizawa et al. |
| 2013/0214214 A1* | 8/2013 | Carnahan et al. ....... H01B 1/24 252/511 |

FOREIGN PATENT DOCUMENTS

| | | |
|---|---|---|
| JP | 2009-20006 A | 1/2009 |
| JP | 2010-043880 A | 2/2010 |
| JP | 2010-043881 A | 2/2010 |
| JP | 2010-109121 A | 5/2010 |
| JP | 2011-017626 A | 1/2011 |
| JP | 2011-068206 A | 4/2011 |
| JP | 2012-009506 A | 1/2012 |
| JP | 2012-500611 A | 1/2012 |
| JP | 2012-032325 A | 2/2012 |
| JP | 2012-73150 A | 4/2012 |
| JP | 2012-123744 A | 6/2012 |
| JP | 2012-225727 A | 11/2012 |
| WO | 2009/102077 A1 | 8/2009 |
| WO | 2010/095581 A1 | 8/2010 |
| WO | 2012/105690 A1 | 8/2012 |
| WO | 2013/031958 A1 | 3/2013 |

OTHER PUBLICATIONS

International Search Report issued in corresponding International Application No. PCT/JP2014/059143 dated May 13, 2014 (2 pages).
Office Action in counterpart Japanese Patent Application No. 2015-508765 dated Oct. 17, 2017 (6 pages).
Suganuma, K. et al, "Low Temperature Wiring for Printed Electronics" vol. 14, No. 6, p. 471-476, 2011 (14 pages).

* cited by examiner

Sectional View Taken on Line A-A

CAPACITIVE SENSOR SHEET AND CAPACITIVE SENSOR FOR MEASURING ELASTIC DEFORMATION

TECHNICAL FIELD

The present invention relates to a capacitive sensor sheet, and particularly to a capacitive sensor sheet which is used for measuring at least one of an amount of strain due to elastic deformation and a distribution of strain due to elastic deformation, and a capacitive sensor using the capacitive sensor sheet.

BACKGROUND ART

The capacitive sensor sheet can detect a concavo-convex shape of a measuring object from changes in capacitance between a pair of electrode layers, and can be used for contact-pressure distribution sensors and sensors such as a strain gages. In general, the capacitance in a capacitive sensor is represented by the following formula (1):

$$C = \varepsilon_0 \varepsilon_r S/d \qquad (1)$$

In the above formula, C represents a capacitance, $\varepsilon_0$ represents a dielectric constant in a free space, $\varepsilon_r$ represents a relative permittivity of a dielectric layer, S represents an area of the electrode layer, and d represents a distance between electrodes.

Conventionally, as a capacitive sensor sheet used as the contact-pressure distribution sensor, for example, a sensor sheet including a dielectric layer made of an elastomer, and a pair of electrode layers (top electrode and bottom electrode) formed by containing an elastomer and conductive fillers, wherein the dielectric layer is sandwiched between the pair of electrode layers, is known (refer to Patent Literature 1).

Such a sensor sheet has a characteristic that the change in capacitance is relatively large since the dielectric layer is composed of an elastomer.

However, in the conventional capacitive sensor sheets to be used for the contact-pressure distribution sensors, a load distribution of the measuring object can be measured, but the amount of deformation by the load cannot be measured. For example, when the sensor sheet is attached to a soft article like a cushion and a load is applied to the sensor sheet, it is not possible to measure how the cushion is deformed.

Further, in the capacitive sensor sheet used as the contact-pressure distribution sensor, a displacement (elongation rate) of the dielectric layer during measurement is usually about several percentages. Therefore, even in the dielectric layer having flexibility, its elongation rate is about several percentages although it has bendability. On the other hand, in the capacitive sensor sheet to be used for measuring the amount of strain due to elastic deformation or the distribution of strain due to elastic deformation, it is not uncommon for a displacement (elongation rate) of the dielectric layer during measurement, depending on the form of usage, to exceed 100%.

Therefore, a high elongation rate is required of the dielectric layer of the capacitive sensor sheet to be used for measuring the amount of strain due to elastic deformation or the distribution of strain due to elastic deformation. Further, it is required of the electrode layer that when elongating the dielectric layer, the electrode layer can follow the elongation and electric conductivity is maintained (electric resistance does not increase).

The capacitive sensor sheet described in Patent Literature 1 cannot adequately satisfy such requirements, and it has been difficult to use the sensor as a capacitive sensor sheet for use in measuring at least one of the amount of strain due to elastic deformation and the distribution of strain due to elastic deformation. Particularly, when the electrode layer is formed using conductive fillers such as carbon black, a conductive path is easily cut off when the electrode layer is elongated with the elongation of the dielectric layer, and therefore the electrode layer cannot be used for measurement of the amount of strain due to elastic deformation and the distribution of strain due to elastic deformation.

CITATION LIST

Patent Literature

Patent Literature 1: Japanese Unexamined Patent Publication No. 2010-43881

SUMMARY OF INVENTION

Technical Problem

The capacitive sensor sheet to be used for a sensor for the amount of strain due to elastic deformation, and the capacitive sensor sheet to be used for a sensor for the distribution of strain due to elastic deformation require that the dielectric layer and the electrode layer have a high elongation rate, and such excellent durability that peeling is hardly generated between the electrode layer and the dielectric layer or a reduction in electric conductivity (an increase of electric resistance) of the electrode layer is small even when the sensor sheet undergoes large elastic deformation or cyclic deforming.

The present invention was made in view of such circumstances, and it is an object of the present invention to provide a capacitive sensor sheet which has a high elongation rate to be able to follow the deformation or action of a flexible measuring object, and has excellent durability for elastic deformation and cyclic deforming and can be used for measuring at least one of an amount of strain due to elastic deformation and a distribution of strain due to elastic deformation.

Solution to Problem

A capacitive sensor sheet of the present invention pertains to:

a capacitive sensor sheet which is used for measuring at least one of an amount of strain due to elastic deformation and a distribution of strain due to elastic deformation, the capacitive sensor sheet including:

a dielectric layer; a top electrode layer laminated on the obverse surface of the dielectric layer; and a bottom electrode layer laminated on the reverse surface of the dielectric layer, wherein the dielectric layer is composed of an elastomer composition containing a urethane elastomer, and each of the top electrode layer and the bottom electrode layer is composed of an electroconductive composition containing carbon nanotubes.

An elongation rate which the capacitive sensor sheet can endure in uniaxial tensile is preferably 30% or more.

In the capacitive sensor sheet, the urethane elastomer is preferably an olefin-based urethane elastomer, an ester-based urethane elastomer or an ether-based urethane elastomer.

In the capacitive sensor sheet, the carbon nanotubes preferably have an average length of 100 μm or more and a purity of 99% by weight or more.

In the capacitive sensor sheet, average thicknesses of each of the top electrode layer and the bottom electrode layer is preferably 0.1 to 10 μm.

Further, it is preferred that the top electrode layer and the bottom electrode layer each include a plurality of rectangular bodies arranged in parallel to one another, and the top electrode layer and the bottom electrode layer intersect substantially at a right angle as viewed from the obverse-reverse direction.

A capacitive sensor of the present invention pertains to a capacitive sensor which is used for measuring at least one of the amount of strain due to elastic deformation and the distribution of strain due to elastic deformation, the capacitive sensor including:

a capacitive sensor sheet of the present invention;

a measurement instrument; and external conducting wires by which each of the top electrode layer and the bottom electrode layer is connected to the measurement instrument.

Advantageous Effects of Invention

Since the capacitive sensor sheet of the present invention includes a dielectric layer made of a urethane elastomer and electrode layers composed of an electroconductive composition containing carbon nanotubes, the sensor has a high elongation rate, can follow the deformation or action of a flexible measuring object to have an excellent measurement accuracy, and does not cause peeling between the dielectric layer and the electrode layers against elastic deformation or cyclic deforming and has excellent durability (long-term reliability), and therefore the sensor can be suitably used for measuring at least one of an amount of strain due to elastic deformation and a distribution of strain due to elastic deformation.

Further, since the urethane elastomer is low in permanent strain (or permanent elongation), the capacitive sensor sheet of the present invention does not change in an initial capacitance (capacitance at the time of no load) even when it is used repeatedly (for example, stretching is repeated thousand times) and can maintain excellent measurement accuracy for long period of time.

Since the capacitive sensor of the present invention includes the capacitive sensor sheet of the present invention, the capacitive sensor is a capacitive sensor which is excellent in measurement accuracy and durability (long-term reliability) and measures at least one of the amount of strain due to elastic deformation and the distribution of strain due to elastic deformation.

DESCRIPTION OF EMBODIMENTS

Hereinafter, embodiments of the present invention will be described in reference to drawings.

First Embodiment

Figure 1A:
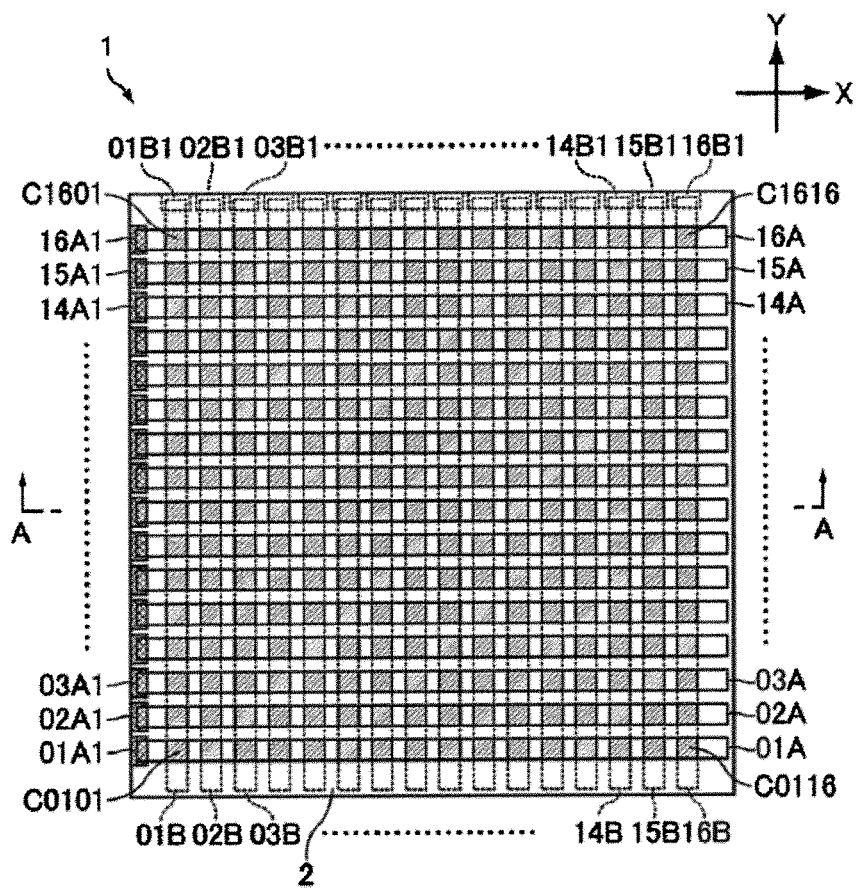
FIG. 1A is a plan view schematically showing an example of a capacitive sensor sheet of the embodiment of the present invention.
Figure 1B:
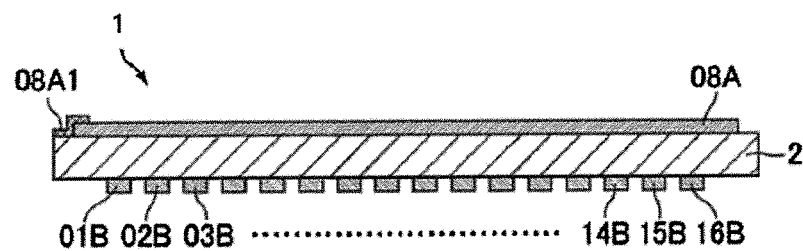
FIG. 1B is a sectional view take on line A-A of the capacitive sensor sheet shown in FIG. 1A.

FIG. 1A is a plan view schematically showing an example of a capacitive sensor sheet of the embodiment of the present invention, and FIG. 1B is a sectional view take on line A-A of the capacitive sensor sheet shown in FIG. 1A.

As shown in FIGS. 1A and 1B, the capacitive sensor sheet 1 of the embodiment of the present invention includes a sheet-shaped dielectric layer 2, rectangular top electrode layers 01A to 16A laminated on the obverse surface of the dielectric layer 2, rectangular bottom electrode layers 01B to 16B laminated on the reverse surface of the dielectric layer 2, top connecting portions 01A1 to 16A1 for connection to external conducting wire, disposed at one ends of the top electrode layers 01A to 16A, and bottom connecting portions 01B1 to 16B1 for connection to external conducting wire, disposed at one ends of the bottom electrode layers 01B to 16B.

Portions, at which the top electrode layers and the bottom electrode layers intersect as viewed from the obverse-reverse direction (thickness direction of the dielectric layer), are detection portions C0101 to C1616. In addition, left two-digit "○○" in symbols "C○○ΔΔ" of the detection portion corresponds the top electrode layers 01A to 16A, and right two-digit "ΔΔ" corresponds the bottom electrode layers 01B to 16B.

The top electrode layers 01A to 16A are respectively formed of a rectangle and composed of 16 electrode layers laminated on the obverse surface of the dielectric layer 2. Each of the top electrode layers 01A to 16A extends in an X-direction (lateral direction in FIG. 1A). The top electrode layers 01A to 16A are respectively arranged at predetermined intervals in a Y-direction (vertical direction in FIG. 1A) and in nearly parallel to one another.

The bottom electrode layers 01B to 16B are respectively formed of a rectangle and composed of 16 electrode layers laminated on the reverse surface of the dielectric layer 2. The bottom electrode layers 01B to 16B are arranged so that each of the bottom electrode layers 01B to 16B intersects the top electrode layers 01A to 16A substantially at a right angle as viewed from the obverse-reverse direction. That is, each of the bottom electrode layers 01B to 16B extends in a Y-direction. Further, the bottom electrode layers 01B to 16B are respectively arranged at predetermined intervals in an X-direction and in nearly parallel to one another.

By arranging each of the top electrode layers 01A to 16A and the bottom electrode layers 01B to 16B as described above, when measuring the position and size of the deformation of a measuring object, the number of the electrode layers to be arranged and the number of the electrode wires can be reduced. That is, when the above-mentioned aspect is employed, the detection portions are efficiently arranged.

Hereinafter, arrangement will be described in more detail. In the example shown in FIGS. 1A and 1B, the detection portion, at which the top electrode layer intersects the bottom electrode layer in a thickness direction, exists at 256 (16×16) locations, and if the detection portions positioned at the 256 locations are independently formed, 512 (256×2) conducting wires are required for detecting the capacitance of the detection portion since the top electrode and the bottom electrode exist per each detection portion. On the other hand, like the example shown in FIGS. 1A and 1B, when the top electrode layers and the bottom electrode layers each include a plurality of rectangular bodies arranged in parallel to one another, and the top electrode layers and the bottom electrode layers intersect substantially at a right angle as viewed from the obverse-reverse direction, detection of the capacitance in the detection portion requires only 32 (16+16) conducting wires. Therefore, as described above, the detection portion comes to be arranged efficiently.

In the capacitive sensor sheet having such a constitution, a capacitive sensor is formed by connection to a measurement instrument as described later, and thereby it is possible that by switching each of 16 conducting wires by an external switching circuit, a capacitance of each of 256 detection portions can be measured while switching 256 detection portions one by one. As a result of this, the amount of strain of each detection portion and positional information of strain within the capacitive sensor sheet can be detected.

In the capacitive sensor sheet of the embodiment of the present invention, the elongation rate which the capacitive sensor sheet can endure in uniaxial tensile is preferably 30% or more, more preferably 50% or more, moreover preferably 100% or more, and particularly preferably 200% or more. On the other hand, an upper limit of the elongation rate which the capacitive sensor sheet can endure in uniaxial tensile is not particularly limited; however, it is about 600%.

The reason for this is that followability to the deformation or action of a flexible measuring object is improved by increasing the elongation rate and it becomes possible to measure the deformation and strain exactly and in a wide measurement range.

In addition, in the embodiment of the present invention, the term "the elongation rate which the capacitive sensor sheet can endure in uniaxial tensile" refers to an elongation rate which is equal to or lower than elongation at break in a tensile test according to JIS K 6251 and returns to its original state after releasing a tensile load. For example, "the elongation rate which the capacitive sensor sheet can endure in uniaxial tensile is 30%" means that the sensor sheet does not break when being stretched by 30% in a direction of one-axis and returns to its original state after releasing a tensile load (that is, the elongation rate is within a range of an elastic deformation).

In the capacitive sensor sheet, the elongation rate which the capacitive sensor sheet can endure in uniaxial tensile can be controlled by design of the dielectric layer. This elongation rate can be particularly controlled by design of a urethane elastomer (such as compounding of polyol component and isocyanate component).

In addition, as described above, the capacitive sensor sheet of the embodiment of the present invention is preferred when the elongation rate which the capacitive sensor sheet can endure in uniaxial tensile is higher, and particularly preferred when the elongation rate is 200% or more. On the other hand, in the case of the electrode layer formed by using carbon nanotubes, since the above-mentioned elongation rate can be easily achieved, the elongation rate of the capacitive sensor sheet comes to depend on the elongation rate of the dielectric layer, and for example, when the elongation rate of the dielectric layer exceeds 200%, the elongation rate of the capacitive sensor sheet also exceeds 200%.

The capacitive sensor sheet 1 having such a constitution becomes a capacitive sensor by connecting each of the top electrode layers and the bottom electrode layers to the measurement instrument with external conducting wires interposed therebetween, as described later, and it becomes possible to measure at least one of the amount of strain due to elastic deformation and the distribution of strain due to elastic deformation.

Figure 2:
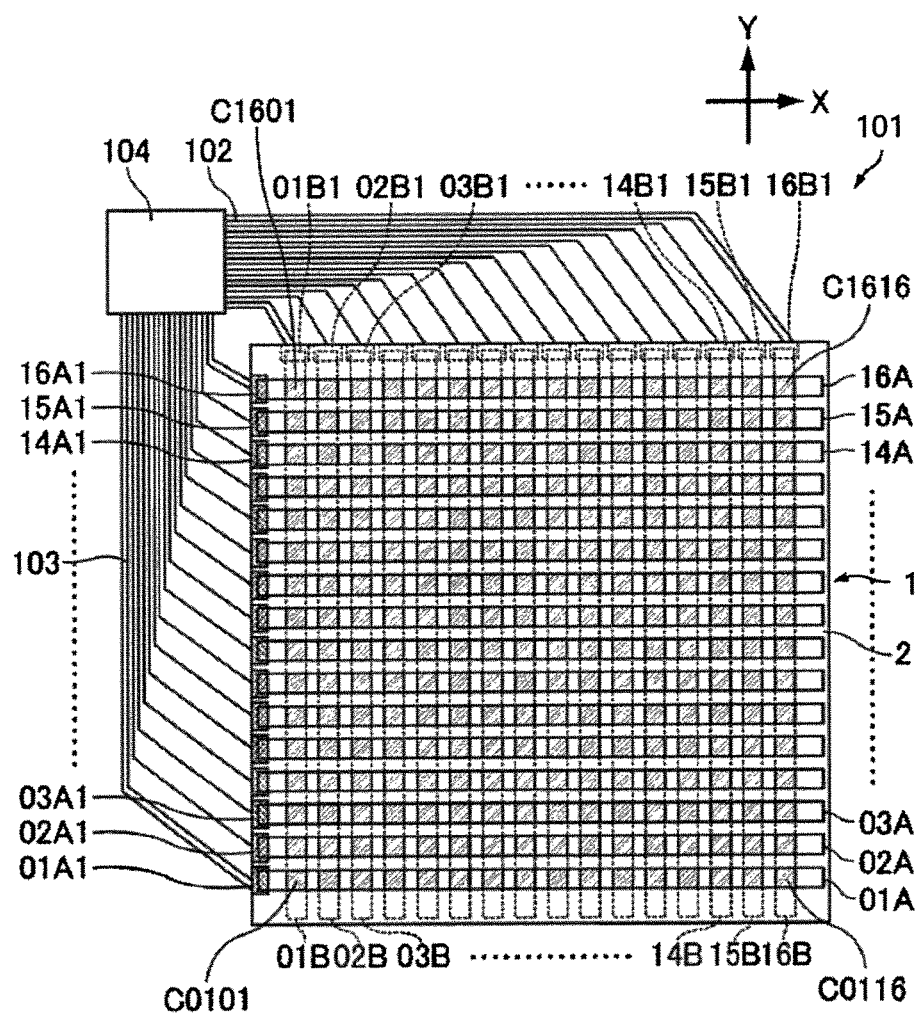
FIG. 2 is a schematic view showing an example of a capacitive sensor using the capacitive sensor sheet shown in FIGS. 1A and 1B.

Examples of the capacitive sensor using the capacitive sensor sheet 1 shown in FIGS. 1A and 1B include a sensor having a constitution as shown in FIG. 2.

FIG. 2 is a schematic view showing an example of the capacitive sensor using the capacitive sensor sheet shown in FIG. 1.

The capacitive sensor 101 shown in FIG. 2 includes the capacitive sensor sheet 1 shown in FIGS. 1A and 1B, external conducting wires 102 and 103, and measurement instrument 104.

Each of the top connecting portions 01A1 to 16A1 of the capacitive sensor sheet 1 is connected to the measurement instrument 104 with the external conducting wire 103 formed by binding a plurality (16) of conducting wires together interposed therebetween, and each of the bottom connecting portions 01B1 to 16B1 is connected to the measurement instrument 104 with the external conducting wire 102 formed by binding a plurality (16) of conducting wires together interposed therebetween.

In addition, the external conducting wires may be connected to only one ends of the top electrode layers and the bottom electrode layers as shown in FIG. 2; however, in some cases, the external conducting wires may be connected to both ends.

The measurement instrument 104 includes, not shown, a power source circuit, a computing circuit, a circuit for measuring the capacitance, a switching circuit of pixels and a display device, as required. Specific examples thereof include an LCR meter and the like.

A capacitive sensor including such a capacitive sensor sheet also constitutes the present invention.

In addition, design of appearance configuration such as the average thickness, width and length of the capacitive sensor sheet 1 can be appropriately changed in accordance with use of the capacitive sensor sheet 1 to be used.

Hereinafter, each constituent member of the capacitive sensor sheet will be described.

<Dielectric Layer>

The dielectric layer has a sheet shape and is composed of an elastomer composition containing a urethane elastomer. A shape, in a plan view, of the dielectric layer is not particularly limited and it may have a rectangular shape as shown in FIG. 1A, or may have other shapes such as a circular shape.

The elastomer composition contains at least a urethane elastomer. Since the capacitive sensor sheet of the embodiment of the present invention includes a dielectric layer composed of an elastomer composition containing a urethane elastomer, the capacitive sensor sheet is specially excellent in point of having excellent adhesion to the electrode layer composed of an electroconductive composition containing carbon nanotubes. The electroconductive composition may be composed of only carbon nanotubes.

Further, since the dielectric layer is composed of an elastomer composition containing a urethane elastomer, which is low in permanent strain (or permanent elongation), the dielectric layer does not change in an initial capacitance (capacitance at the time of no load) even when it is used repeatedly (for example, stretching is repeated thousand times) and can maintain excellent measurement accuracy for long period of time The urethane elastomer is not particularly limited and examples thereof include olefin-based urethane elastomers containing olefin-based polyol as a polyol component; ester-based urethane elastomers containing ester-based polyol as a polyol component; ether-based urethane elastomers containing ether-based polyol as a polyol component; carbonate-based urethane elastomers containing carbonate-based polyol as a polyol component; and castor oil-based urethane elastomers containing castor oil-based polyol as a polyol component. These compounds may be used singly, or may be used in combination of two or more thereof.

The urethane elastomer may be used in combination of two or more of the above-mentioned polyol components.

Among these compounds, olefin-based urethane elastomers are preferred from the viewpoint of high volume resistivity, and ester-based urethane elastomers are preferred from the viewpoint of a high elongation rate and high relative permittivity.

Naturally, various urethane elastomers may be mixed in consideration of the volume resistivity, the elongation rate and the dielectric constant to be imparted to the dielectric layer.

Examples of the olefin-based polyols include EPOL (produced by Idemitsu Kosan Co., Ltd.).

Examples of the ester-based polyol include POLYLITE 8651 (produced by DIC Corporation).

Examples of the ether-based polyol include polyoxytetramethylene glycol, PTG-2000SN (produced by Hodogaya Chemical Co., Ltd.), polypropylene glycol, PREMINOL S3003 (produced by ASAHI GLASS CO., LTD.) and the like.

Further, the elastomer composition may contain additives such as a plasticizer, a chain extender, a crosslinking agent, a catalyst, a vulcanization accelerator, an antioxidant, an age resistor and a coloring agent in addition to the urethane elastomer.

Further, the elastomer composition may further contain dielectric fillers of barium titanate or the like. The reason for this is that by containing the dielectric fillers, the capacitance C can be increased and consequently, detection sensitivity of the capacitive sensor sheet can be enhanced.

When the elastomer composition contains the dielectric fillers, the content of the dielectric filler in the elastomer composition is usually higher than 0% by volume and about 25% by volume or less.

When the content of the dielectric filler is more than 25% by volume, the hardness of the dielectric layer may be increased or permanent strain may be increased. Further, in forming a dielectric layer made of a urethane elastomer, since viscosity of liquid before curing increases, formation of a thin film may become difficult.

The average thickness of the dielectric layer is preferably 10 μm or more and 1000 μm or less, and more preferably 30 μm or more and 200 μm or less from the viewpoint of increasing capacitance C to improve detection sensitivity and from the viewpoint of improving followability to the measuring object.

A relative permittivity of the dielectric layer at room temperature is preferably 2 or more, and more preferably 5 or more. When the relative permittivity of the dielectric layer is less than 2, the capacitance C is reduced and therefore there is a possibility that adequate sensitivity may not be attained in using the dielectric layer as a sensor.

A Young's modulus of the dielectric layer is preferably 0.1 MPa or more and 1 MPa or less. When the Young's modulus is less than 0.1 MPa, the dielectric layer is too soft, and therefore high quality processing may be difficult and adequate measurement accuracy may not be attained. On the other hand, when the Young's modulus is higher than 1 MPa, there is a possibility that since the dielectric layer is too hard, it interferes with the action of deformation of the measuring object when a deformation-load of the measuring object is small, and therefore measuring results do not meet a measuring object.

Hardness of the dielectric layer is preferably 0 to 30° in terms of the hardness (JIS A hardness) using a type A durometer according to JIS K 6253, or 10 to 55° in terms of the hardness (JIS C hardness) using a type C durometer according to JIS K 7321.

When the hardness using the type C durometer is less than 10°, the dielectric layer is too soft, and therefore high quality processing may be difficult and adequate measurement accuracy may not be attained, and on the other hand, when the hardness using the type C durometer is more than 55°, the dielectric layer is too hard, and therefore it interferes with the action of deformation of the measuring object when a deformation-load of the measuring object is small, and therefore measuring results do not meet a measuring object.

<Top Electrode Layer/Bottom Electrode Layer>

Both of the top electrode layer and the bottom electrode layer are composed of an electroconductive composition containing carbon nanotubes. In the present specification, the top electrode layer and the bottom electrode layer are collectively also referred to merely as electrode layers.

In addition, the top electrode layer and the bottom electrode layer are usually formed by using the same material, but the same material does not have to be used.

As the carbon nanotube, publicly known carbon nanotubes can be used. The carbon nanotube may be single-walled carbon nanotube (SWNT) or may be multi-walled carbon nanotubes (MWNT).

Among these carbon nanotubes, the single-walled carbon nanotube having a smaller diameter and a larger aspect ratio is preferred.

The average length of the carbon nanotubes is preferably 1 μm or more, more preferably 10 μm or more, moreover preferably 100 μm or more, particularly preferably 300 μm or more, and most preferably 600 μm or more. On the other hand, an upper limit of the average length of the carbon nanotubes is not particularly limited, and the upper limit is about 1000 μm.

The aspect ratio of the carbon nanotube is preferably 100 or more, more preferably 1000 or more, moreover preferably 10000 or more, and particularly preferably 30000 or more.

By using a long carbon nanotube, the electrode layers (top electrode layer/bottom electrode layer) exert excellent stretchability to enable to improve followability to the deformation of the dielectric layer. Further, when using the long carbon nanotube, variation in electric resistance is small in stretching the dielectric layer repeatedly, and therefore long-term reliability is excellent. The reason for this is probably that in the case of the long carbon nanotube, the carbon nanotube itself is easily stretched, and consequently a conductive path is hardly cut off when the electrode layer is elongated following the dielectric layer. Further, when the electrode layer is formed by using carbon nanotubes, the electric conductivity is developed by contact (electric contact is formed) between carbon nanotubes. Herein, when the long carbon nanotube is used, the electric conductivity is ensured by fewer electric contacts and the number of electric contacts with other carbon nanotubes in one carbon nanotube is larger compared with the case where a short carbon nanotube is used, and therefore a high-level electrical network can be formed, and this is regarded as a reason why the conductive path is hardly cut off.

In addition, in the embodiment of the present invention, a selection of what shaped (average length and aspect ratio) carbon nanotube is used may be appropriately made considering the intended use of the capacitive sensor, the electric conductivity and durability required of the electrode layer, and treatment and cost for forming the electrode layer in a comprehensive manner.

In the embodiment of the present invention, it is advantageous that use of long carbon nanotubes (carbon nanotubes having a large length and a large aspect ratio) is advantageous from the following points.

As a technique of improving the electric conductivity of the electrode layer containing carbon nanotubes, in general, a method, in which the electrode layer is coated with or mixed with a low molecular material such as a charge transport material or an ionic liquid as a dopant, is conceivable. However, when the dopant is used in the electrode layer included in the capacitive sensor sheet of the embodiment of the present invention, there is a fear of migration of the dopant into the dielectric layer. When the dopant migrates into the dielectric layer, there is a fear that an electrically insulating property of the dielectric layer is deteriorated (reduction in volume resistivity) or durability at the time of repeated use is deteriorated, and consequently there is a possibility that the measurement accuracy may be deteriorated.

In contrast, when long carbon nanotubes as described above are used as the carbon nanotubes, it is possible to impart sufficient electric conductivity to the electrode layer without using the dopant.

The carbon nanotubes preferably have a purity of 99% by weight or more.

The carbon nanotubes may contain a catalytic metal, a carbon material not converted to a nanotube (amorphous carbon, graphite, etc.), or a dispersant in its production process. The reason for this is that when the electrode layer is formed using such carbon nanotubes containing a large amount of components (impurities) other than the carbon nanotube, the electric conductivity and elongation rate of the electrode layer may be deteriorated and there is a possibility that the elastic modulus of the electrode layer is increased to make the sensor sheet hard, resulting in a reduction of stretchability.

The electroconductive composition may contain a binder component as a binding material of carbon nanotubes in addition to the carbon nanotubes.

When the electrode layers contain the binder component, it is possible to improve the adhesion to the dielectric layer and to improve the strength of the electrode layer itself. Moreover, when the electrode layers contain the binding component, it is possible to enhance safety in forming the electrode layers since scattering of the carbon nanotubes can be prevented in forming the electrode layers by a method described later.

As the binder component, a urethane elastomer is preferred, and particularly, a urethane elastomer identical in species to the urethane elastomer constituting the dielectric layer, is preferred. The reason for this is that the adhesion between the dielectric layer and the electrode layers can be remarkably improved.

The binder component may be a binder component other than the urethane elastomer, and in this case, a binder component composed of a polymer (e.g., a polymer in which a difference in SP value with the urethane elastomer is ±1) whose solubility parameter (SP value) is close to that of the urethane elastomer, is preferred. Specific examples of such a binder component include polyisoprene, a butyl rubber, an ethylene-propylene rubber, polyethylene, chlorosulfonated polyethylene, a natural rubber, a isoprene rubber, a butadiene rubber, a styrene-butadiene rubber, polystyrene, a chloroprene rubber, a nitrile rubber, polymethylmethacrylate, polyvinylacetate, polyvinylchloride, an acrylic rubber, a styrene-ethylene-butylene-styrene block copolymer (SEBS) and the like.

Further, as the above-mentioned binder component, a raw rubber (an unvulcanized natural rubber and an unvulcanized synthetic rubber) can also be used. When a material having relatively weak elasticity like the raw rubber is used, the followability of the electrode layers to the deformation of the dielectric layer can be enhanced.

The electroconductive composition may contain a variety of additives in addition to the carbon nanotubes and the binder components. Examples of the additives include a dispersant for enhancing dispersibility of the carbon nanotubes, a crosslinking agent for the binder, a vulcanization accelerator, a vulcanization aid, an age resistor, a plasticizer, a softening agent, and a coloring agent.

Herein, when the electroconductive composition contains a plasticizer and the elastomer composition also contains plasticizer, concentrations of both plasticizers in both compositions are preferably the same. The reason for this is that a transition of the plasticizer between the dielectric layer and the electrode layer can be prevented, and thereby the occurrence of warpage and wrinkle in the capacitive sensor sheet can be suppressed.

Further, in the capacitive sensor sheet of the embodiment of the present invention, the electrode layer can be formed of virtually only carbon nanotubes. The reason for this is that in the capacitive sensor sheet, since the dielectric layer is composed of an elastomer composition containing a urethane elastomer, even an electrode layer composed of only carbon nanotubes can secure sufficient adhesion between the electrode layer and the dielectric layer.

The content of the carbon nanotubes in the electrode layer is not particularly limited as long as it is a content at which electric conductivity is exerted, and in the case of containing a binder component, the content is, depending on the kind of the binder component, preferably 0.1 to 100% by weight with respect to the total solid content of the electrode layer.

When the content of the carbon nanotubes is increased, a reduction in the electric conductivity (increase in electric resistance) of the electrode layers at the time when the sensor sheet undergoes cyclic deforming can be suppressed, and the sensor sheet can be excellent in durability.

On the other hand, when the amount of the carbon nanotubes is small and the amount of the binder component is large, there is a possibility that elasticity of the electrode layer may increase, and therefore the electrode layer becomes a buffer layer to the deformation and displacement of a measuring object, resulting in a reduction of measurement accuracy.

The average thickness of each of the electrode layers (average thickness of each of the top electrode layer and the bottom electrode layer) is preferably 0.1 μm or more and 10 μm or less. The reason for this is that when the average thickness of each of the electrode layers is within the above-mentioned range, the electrode layers can exert excellent following properties to the deformation of the dielectric layer.

In contrast, when the average thickness is less than 0.1 μm, there is a possibility that electric conductivity may be insufficient, resulting in a reduction of measuring accuracy. On the other hand, when the average thickness is more than 10 μm, the capacitive sensor sheet becomes hard by the reinforcing effect of the carbon nanotubes and therefore the following properties to the measuring object may be deteriorated to interfere with the deformation such as stretch.

In the present specification, "the average thickness of the electrode layers" was measured by using a laser microscope (e.g., VK-9510 manufactured by KEYENCE Corporation).

Specifically, the electrode layer laminated on the surface of the dielectric layer is scanned in increments of 0.01 μm in a direction of thickness to measure a three-dimensional shape, and then an average height of a rectangular area 200 μm length×200 μm wide is measured in each of a region where the electrode layer is laminated on the surface of the dielectric layer and a region where the electrode layer is not laminated, and a difference in the average height between the two areas is taken as an average thickness of the electrode layer.

The transparency (transmittance of visible light) of the top electrode layers and the bottom electrode layers is not particularly limited and the electrode layers may be transparent or may be opaque.

In the capacitive sensor sheet of the embodiment of the present invention, the dielectric layer is composed of an elastomer composition containing a urethane elastomer and can be easily a transparent dielectric layer. Accordingly, in the capacitive sensor sheet, by enhancing the transparency of the top electrode layer and the bottom electrode layer, a capacitive sensor sheet which is transparent as a whole can be formed. However, when the electrode layer is formed using an electroconductive composition containing carbon nanotubes, since carbon nanotubes need to be subjected to pretreatment such as high level of dispersion treatment or refining treatment, the step of forming the electrode layer becomes complicated and is economically disadvantageous.

On the other hand, the transparency of the electrode layer does not have an effect on the performance as the capacitive sensor sheet.

When the transparency as the capacitive sensor sheet is required, transparent electrode layer (for example, transmittance of visible light (550 nm) is 85% or more) may be formed, and when the transparency is not required, opaque electrode layer may be formed. The opaque electrode layer can be produced more easily and at lower cost.

<Detection Portion: C0101 to C1616 in FIGS. 1A and 1B>

The detection portions C0101 to C1616, as indicated by hatching in FIG. 1A, are arranged at locations at which the top electrode layers 01A to 16A and the bottom electrode layers 01B to 16B intersect (overlapped portion) in a thickness direction of the dielectric layer. In the capacitive sensor sheet 1, 256 (16×16) detection portions C0101 to C1616 are arranged in total. The detection portions C0101 to C1616 are arranged at nearly regular intervals over almost the entire surface of the capacitive sensor sheet 1. Each of the detection portions C0101 to C1616 is composed of part of the top electrode layers 01A to 16A, part of the bottom electrode layers 01B to 16B and part of the dielectric layer 2.

In the capacitive sensor sheet of the embodiment of the present invention having such a constitution, a change amount $\Delta C$ in capacitance between the capacitance C before placing a measuring object and the capacitance C after placing a measuring object is detected, and thereby, it is possible to determine the amount of strain due to elastic deformation and the distribution of strain due to elastic deformation.

The capacitive sensor sheet of the embodiment of the present invention has a high elongation rate, can be stretched by 30% or more repeatedly in a direction of one-axis, can follow the deformation or action of a flexible measuring object, and has excellent durability for elastic deformation and cyclic deforming, and for example, the capacitive sensor sheet can trace the shape of the measuring object or directly detect the motion of the measuring object.

Other Embodiment

Figure 3:
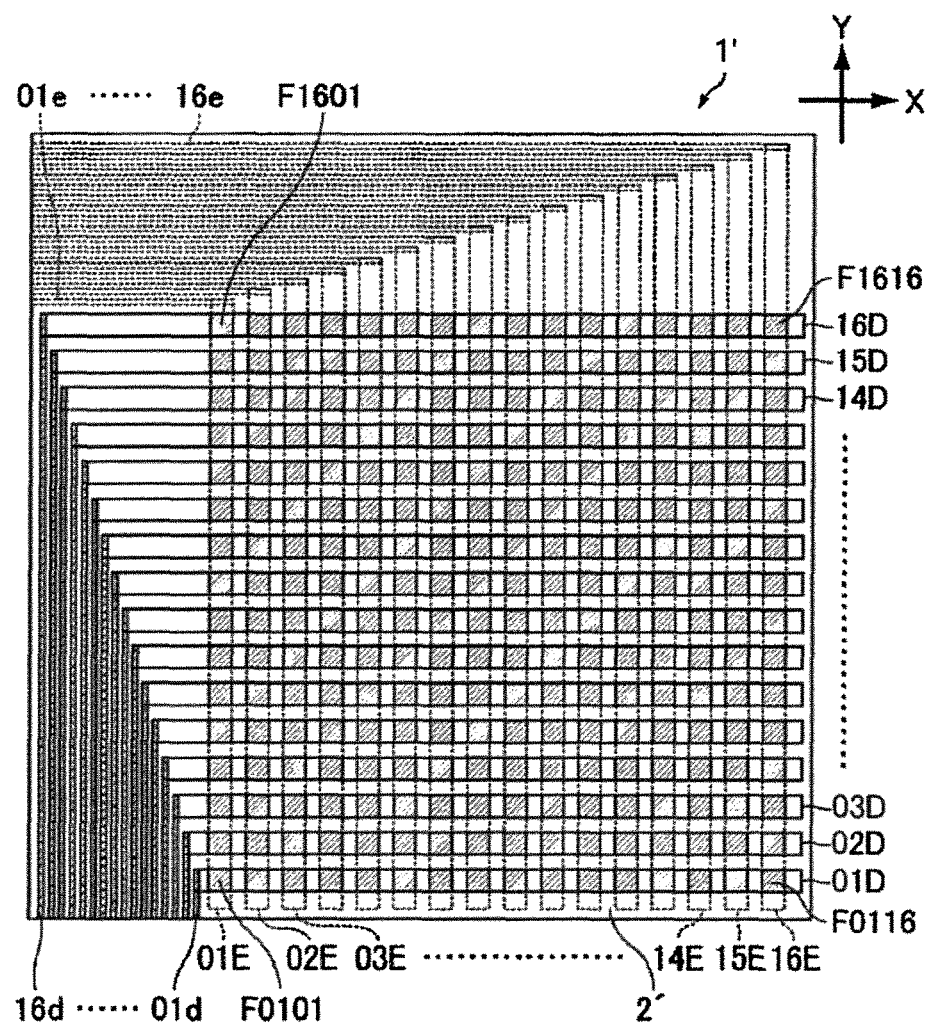
FIG. 3 is a plan view schematically showing another example of the capacitive sensor sheet of the embodiment of the present invention.

The constitution of the capacitive sensor sheet of the embodiment of the present invention is not limited to the constitution of the capacitive sensor sheet shown in FIGS. 1A and 1B, and the capacitive sensor sheet may have the constitution as shown in FIG. 3.

FIG. 3 is a plan view schematically showing another example of the capacitive sensor sheet of the embodiment of the present invention.

The capacitive sensor sheet 1' shown in FIG. 3 includes a sheet-shaped dielectric layer 2', rectangular top electrode layers 01D to 16D laminated on the obverse surface of the dielectric layer 2', rectangular bottom electrode layers 01E to 16E laminated on the reverse surface of the dielectric layer 2', top conducting wires 01*d* to 16*d* connected to one ends of the top electrode layers 01D to 16D and extended to an outer edge of the dielectric layer 2', and bottom conducting wires 01*e* to 16*e* connected to one ends of the bottom electrode layers 01E to 16E and extended to an outer edge of the dielectric layer 2'.

Portions, at which the top electrode layers and the bottom electrode layers intersect as viewed from the obverse-reverse direction (thickness direction of the dielectric layer), are detection portions F0101 to F1616. In addition, left two-digit "○○" in symbols "F○○ΔΔ" of the detection portion corresponds the top electrode layers 01D to 16D, and right two-digit "ΔΔ" corresponds the bottom electrode layers 01E to 16E.

The top electrode layers 01D to 16D are respectively formed of a rectangle and composed of 16 electrode layers laminated on the obverse surface of the dielectric layer 2'.

Each of the top electrode layers 01D to 16D extends in an X-direction (lateral direction in FIG. 3). The top electrode layers 01D to 16D are respectively arranged at predetermined intervals in a Y-direction (vertical direction in FIG. 3) and in nearly parallel to one another. Linear top conducting wires 01d to 16d, which are respectively extended in a Y-direction, are connected to left ends of the top electrode layers 01D to 16D. The other ends of the top conducting wires 01d to 16d extend to the outer edge of the dielectric layer 2'.

The bottom electrode layers 01E to 16E are respectively formed of a rectangle and composed of 16 electrode layers laminated on the reverse surface of the dielectric layer 2'. The bottom electrode layers 01E to 16E are arranged so that each of the bottom electrode layers 01E to 16E intersects the top electrode layers 01D to 16D substantially at a right angle as viewed from the obverse-reverse direction. That is, each of the bottom electrode layers 01E to 16E extends in a Y-direction. Further, the bottom electrode layers 01E to 16E are respectively arranged at predetermined intervals in an X-direction and in nearly parallel to one another. Linear bottom conducting wires 01e to 16e, which are respectively extended in a X-direction, are connected to one ends (upper ends) of the bottom electrode layers 01E to 16E. The other ends of the bottom conducting wires 01e to 16e extend to the outer edge of the dielectric layer 2'.

In the capacitive sensor sheet 1' as described above, materials constituting the top conducting wires and the bottom conducting wires are not particularly limited, and a publicly known material used in electric wiring can be used; however, it is preferred to use the same as the above-mentioned material constituting the electrode layers since the conducting wires (top conducting wires and bottom conducting wires) can also be elastically deformed and therefore they do not interfere with the deformation of the sensor sheet by the measuring object.

More specifically, by forming the top conducting wires and the bottom conducting wires so as to be thin in line width and large in thickness using a electroconductive composition similar to the electroconductive composition constituting the electrode layer, it is possible to form wiring which can follow the sensor sheet without impairing the stretchability of the sensor sheet while maintaining sufficient electric conductivity and can withstand a cyclic elongation as with the electrode layer. On the other hand, for example, when the top conducting wires and the bottom conducting wires are formed by using a metal material, it is disadvantageous since there is a possibility that stretchability of a portion on which wiring is formed are impaired.

In addition, each of the other ends of the top conducting wires 01d to 16d and the other ends of the bottom conducting wires 01e to 16e, not shown, is connected to a connector having a metallic contact. The capacitive sensor sheet 1' can be connected to an external conducting wire with the connector interposed therebetween.

The capacitive sensor sheet 1' having such a constitution also becomes a capacitive sensor by connecting each of the top electrode layers and the bottom electrode layers to a measurement instrument with external conducting wires interposed therebetween as with the capacitive sensor sheet 1 shown in FIGS. 1A, 1B, and 2.

Figure 4:
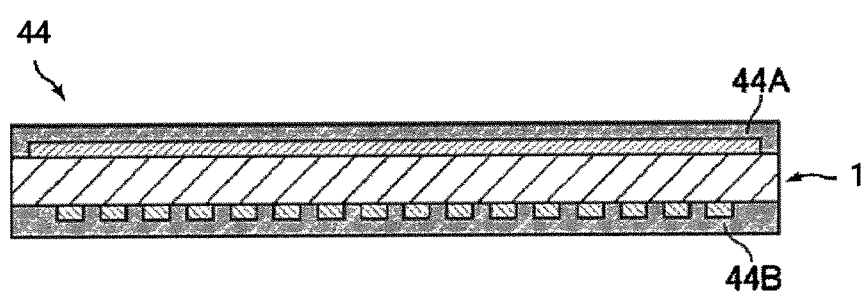
FIG. 4 is a sectional view schematically showing another example of the capacitive sensor sheet of the embodiment of the present invention.

A constitution of the capacitive sensor sheet of the embodiment of the present invention may be a structure shown in FIG. 4.

FIG. 4 is a sectional view schematically showing another example of the capacitive sensor sheet of the embodiment of the present invention.

A capacitive sensor sheet 44 shown in FIG. 4 is formed by forming a top overcoat layer 44A on an outermost side of the obverse side and forming a bottom overcoat layer 44B on an outermost side of the reverse side in the capacitive sensor sheet 1 shown in FIGS. 1A and 1B.

In the capacitive sensor sheet having such a constitution, since the electrode layers are covered with the overcoat layer, the electrode layers can be protected from external impact. Further, in the capacitive sensor sheet, it is possible to suppress electric continuity of the electrode layers with an external member.

When the overcoat layer is formed, the purpose of the overcoat layer is not limited to protection of the electrode layers, and for example, by forming a colored overcoat layer, it is possible to hide the electrode layers from external view, and by coloring a part of the overcoat layer, it is possible to impart good design to the capacitive sensor sheet. Further, the obverse surface of the overcoat layer may be printed. Furthermore, for example, by bringing the overcoat layer into a layer having adhesiveness or tackiness, the measuring object can be bonded to the capacitive sensor sheet, and for example, the surface of the overcoat layer can also be brought into a low-µ surface layer with low friction coefficient.

Specific examples of the case where design is imparted to the overcoat layer (the case where the surface is printed) as described above include the case of using the capacitive sensor sheet of the embodiment of the present invention as an input interface of a flexible touch panel having stretchability. In this case, for example, an apparent button or a keyboard at an input position or a product logo is printed on the obverse surface of the overcoat layer.

When printing is performed on the obverse surface of the overcoat layer, printing may be performed by ink-jet printing, screen printing, gravure printing or the like using, for example, aqueous ink, solvent ink, UV-curable ink or the like.

More specifically, a publicly known solvent ink predominantly including a solvent, a pigment, a vehicle and an adjuvant to be mixed as required may be used, for example, for the solvent ink.

Herein, examples of the solvent include glycol ether-based solvents such as diethylene glycol diethyl ether, tetraethylene glycol dimethyl ether and tetraethylene glycol monobutyl ether; lactone-based solvents such as γ-butyrolactone; low boiling point aromatic naphtha, propylene glycol monomethyl ether acetate and the like.

Examples of the pigment include carbon black (black), copper phthalocyanine (cyan), dimethylquinacridone (magenta), pigment yellow (yellow), titanium oxide, aluminum oxide, zirconium oxide, nickel compound and the like; however, various pigments have been known and the pigment is not limited the above-mentioned pigments.

A material of the overcoat layer is not particularly limited and may be appropriately selected in accordance with the purpose of formation of the overcoat layer, and for example, it is possible to use suitably a composition obtained by mixing, as required, a coloring agent (pigment or dye) in the composition similar to the elastomer composition constituting the dielectric layer.

In addition, in the capacitive sensor sheet of the embodiment of the present invention, the overcoat layer may be formed on only one of a obverse side and a reverse side.

Moreover, the present invention can be embodied in the form in which various modifications and improvements are made in addition to the above embodiment.

For example, the number of the top electrode layers 01A to 16A and the bottom electrode layers 01B to 16B to be arranged is set to 16 in the capacitive sensor sheet 1 in the embodiment shown in FIGS. 1A and 1B, but the number of electrode layers to be arranged is not particularly limited. Also, an angle, at which the top electrode layers 01A to 16A and the bottom electrode layers 01B to 16B in the above embodiment cross each other, is not particularly limited.

Next, a method for manufacturing a capacitive sensor sheet of the embodiment of the present invention will be described.

The above-mentioned capacitive sensor sheet can be manufactured by undergoing, for example, (1) a step of forming a dielectric layer composed of an elastomer composition (hereinafter, also referred to as "step (1)"), and (2) a step of forming electrode layers on the obverse surface and the reverse surface of the dielectric layer by an application of a composition containing carbon nanotubes and a dispersion medium (hereinafter, also referred to as "step (2)").

Hereinafter, the steps will be described in turn.

[Step (1)]

In the present step, a dielectric layer is formed with use of an elastomer composition. At first, an elastomer composition, which is formed by mixing, as required, additives such as a dielectric filler, a plasticizer, a chain extender, a crosslinking agent, a vulcanization accelerator, a catalyst, an antioxidant, an age resistor and a coloring agent in a urethane elastomer (or its raw material: polyol component and isocyanate component), is prepared.

A method of preparing the elastomer composition, and a method of forming the dielectric layer are not particularly limited and a publicly known method can be employed, and a specific method is, for example, as follows. A polyol component, a plasticizer and an antioxidant are weighed and stirred/mixed for a given period of time under heating and reduced pressure to prepare a mixed solution. Next, the mixed solution is weighed, its temperature is adjusted, and then a catalyst is added and the resulting mixture is stirred with AJITER or the like. Thereafter, a predetermined amount of an isocyanate component is added, and the resulting mixed solution is stirred with AJITER or the like, immediately injected into a forming apparatus shown in FIG. 5, and cross-linked/cured while being carried in a state of being sandwiched between protection films to obtain a rolled sheet with protection films, which has a predetermined thickness. Thereafter, a dielectric layer can be manufactured by allowing the rolled sheet to further cross-link (post-crosslinking) for a given period of time in a furnace, as required.

Figure 5:
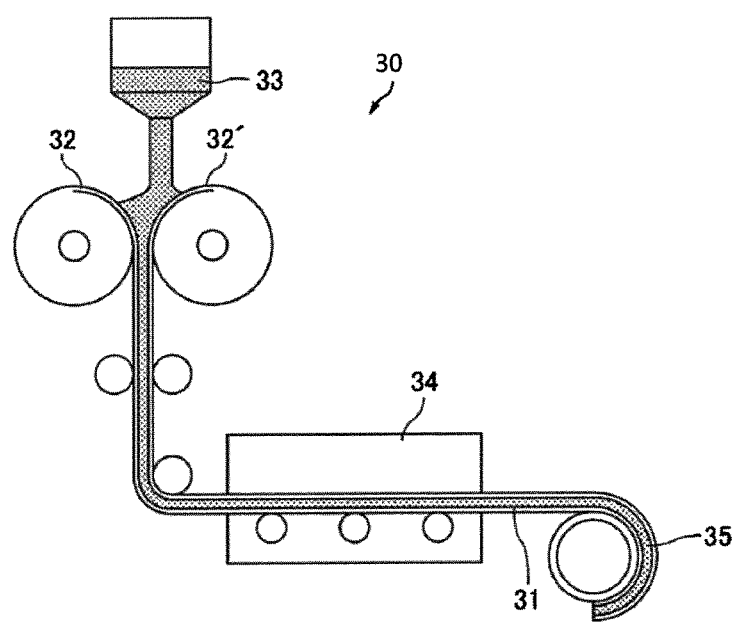
FIG. 5 is a schematic view for explaining an example of a forming apparatus to be used for preparation of a dielectric layer contained in the capacitive sensor sheet of the embodiment of the present invention.

In addition, FIG. 5 is a schematic view for explaining an example of a forming apparatus to be used for preparation of the dielectric layer. In the forming apparatus 30 shown in FIG. 5, a raw material composition 33 is poured into a gap between protection films 31 made of polyethylene terephthalate (PET) continuously sent out from a pair of rollers 32, 32' placed apart from each other and introduced into a heating unit 34 in a state of being held in the gap while allowing a curing reaction (crosslinking reaction) to proceed, and in the heating unit 34, the raw material composition 33 is thermally cured in a state of being held between a pair of PET films 31 to form a sheet-shaped dielectric layer 35.

Further, after preparing a raw material composition, a dielectric layer may be formed using a general-purpose film forming apparatus or a film forming method such as various coating apparatuses, bar coating or doctor blade coating.

[Step (2)]

In the present step, electrode layers (top electrode layer and bottom electrode layer) are formed on the obverse surface and the reverse surface of the dielectric layer by applying a composition containing carbon nanotubes and a dispersion medium.

Specifically, at first, carbon nanotubes are added to a dispersion medium such as toluene. In this time, as required, a binder component (or a raw material of the binder component), a dispersant, or other various additives may be further added.

Next, the resulting respective components containing carbon nanotubes are dispersed (or dissolved) in the dispersion medium by using a wet type dispersing machine, and thereby a application liquid is prepared. Herein, the respective components may be dispersed by using an existing dispersing machine such as an ultrasonic dispersing machine, a jet mill or a beads mill.

In the preparation of the application liquid, the dispersion medium is not limited to toluene, and examples of a dispersion medium other than toluene include methyl isobutyl ketone (MIBK), alcohols, water and the like. These dispersion media may be used alone, or may be used in combination of two or more thereof.

A concentration of the carbon nanotubes in the application liquid is preferably 0.01 to 10% by weight.

When the concentration is less than 0.01% by weight, there may be cases where the application liquid has to be applied repeatedly since the concentration of carbon nanotubes is too low, and on the other hand, when the concentration is higher than 10% by weight, there may be cases where the dispersibility of the carbon nanotube is deteriorated because of too high viscosity of the application liquid or recoagulation of carbon nanotubes, leading to difficulty in formation of uniform electrode layer.

Subsequently, the prepared application liquid is applied in a predetermined shape (rectangle) onto a predetermined position on the surface of the dielectric layer by using an air brush, and dried. The electrode layers are formed, for example, so as to be about 1 mm to 20 mm in width and about 50 mm to 500 mm in length, and to be spaced at intervals of about 1 mm to 5 mm and in nearly parallel to one another.

In this time, the application liquid may be applied after masking, as required, a location on the surface of the dielectric layer where electrode layer is not formed.

Conditions of drying the application liquid are not particularly limited and may be appropriately selected in accordance with the kind of dispersion medium or the like.

A method of applying the application liquid of the electroconductive composition is not limited to the method of applying using the air brush, and a screen printing method and an ink-jet printing method can also be employed.

Further, the obverse surface of the dielectric layer may be subjected to a pretreatment before forming the electrode layers on the obverse surface of the dielectric layer in order to enhance the adhesion between the dielectric layer and the electrode layer. However, since the elastomer composition and the electroconductive composition used in the embodiment of the present invention have extremely excellent adhesion to each other, sufficient adhesion between the dielectric layer and the electrode layer can be ensured without applying any pretreatment.

When the capacitive sensor sheet including the overcoat layer is produced, after completing the step (2), a material for an overcoat layer may be applied to form an overcoat layer.

The overcoat layer can be formed by using a general-purpose film forming apparatus or a film forming method such as various coating apparatuses, bar coating or doctor blade coating.

Further, it is also possible that a crosslinked or semi-crosslinked sheet is prepared separately and the sheet is bonded by lamination to the dielectric layer having the electrode layer formed thereon to form the overcoat layer. When the semi-crosslinked sheet is used, the sheet may be completely crosslinked after bonding the sheet.

The capacitive sensor sheet of the embodiment of the present invention can be produced by undergoing such steps.

The capacitive sensor sheet including the overcoat layer can be produced by undergoing, for example, the following step.

That is, first, an overcoat layer on one side is prepared, and then on the overcoat layer, electrode layer (top electrode layer or bottom electrode layer) is formed by the same method as that of the above step (2). Thereafter, a dielectric layer separately prepared, which is composed of an elastomer composition containing a urethane elastomer, is bonded (laminated) to the electrode layer. Subsequently, the electrode layers (top electrode layers or bottom electrode layers) are formed on the dielectric layer by the same method as that of the above step (2), and finally, an overcoat layer on the other side is formed.

EXAMPLES

Hereinafter, the embodiment of the present invention will be described in more detail by way of Examples, but the embodiment of the present invention is not limited to the following examples.

Preparation of Dielectric Layer

Preparation Example 1: Dielectric Layer Made of Olefin-Based Urethane Elastomer

Hundred parts by mass of liquid hydrogenated hydroxyl group-terminated polyolefin polyol (EPOL, produced by Idemitsu Kosan Co., Ltd.) and 100 parts by mass of a high temperature lubricating oil (MORESCO-HILUBE LB-100, produced by MORESCO Corporation) predominantly composed of alkyl-substituted diphenyl ether were weighed, and stirred/mixed at a rotational speed of 2000 rpm for 3 minutes by using a planetary centrifugal mixer (manufactured by THINKY CORPORATION). Next, to the resulting mixture, 0.07 parts by mass of a catalyst (Fomrez Catalyst UL-28, manufactured by Momentive Performance Materials Inc.) was added, and the resulting mixture was stirred for 1.5 minutes with a planetary centrifugal mixer. Thereafter, 11 parts by mass of isophorone diisocyanate (Desmodur I, produced by Sumika Bayer Urethane Co., Ltd.) was added, and the resulting mixture was stirred for 3 minutes with a planetary centrifugal mixer and defoamed for 1.5 minutes. Thereafter, the resulting mixture was injected into the forming apparatus 30 shown in FIG. 5, and cross-linked/cured under conditions of a temperature of 110° C. and a retention time of 30 minutes in a furnace while being carried in a state of being sandwiched between protection films to obtain a rolled sheet with protection films, which had a predetermined thickness. Thereafter, the obtained sheet was cross-linked for 12 hours in a furnace adjusted to 80° C. to prepare a dielectric layer which was composed of an elastomer composition containing an olefin-based urethane elastomer and has a layer thickness of 50 μm.

The elongation at break (%), the volume resistivity (Ωcm) and the relative permittivity of the prepared dielectric layer were measured, and consequently the elongation at break (%) was 218%, the volume resistivity was $1 \times 10^{14}$ Ωcm or more, and the relative permittivity was 3.1.

Herein, the elongation at break was measured according to JIS K 6251.

The volume resistivity was measured according to JIS K 6911 using Hiresta UP MCP-HT450 (manufactured by Mitsubishi Chemical Analytech Co., Ltd.) as measurement equipment, and USR Probe MCP-HTP14 as a probe.

The relative permittivity was measured according to JIS K 6911 using LCR HiTESTER 3522-50 (manufactured by HIOKI E.E. CORPORATION) as measurement equipment.

Preparation Example 2: Dielectric Layer Made of Ester-Based Urethane Elastomer

Hundred parts by mass of polyester polyol (POLYLITE 8651, produced by DIC Corporation) and 100 parts by mass of dipropylene glycol dibenzoate (BENZOFLEX 9-88, produce by Velsicol. Chemical. Corp.) were weighed, and stirred/mixed at a rotational speed of 2000 rpm for 3 minutes by using a planetary centrifugal mixer (manufactured by THINKY CORPORATION). Next, to the resulting mixture, 0.07 parts by mass of a catalyst (Fomrez Catalyst UL-28, manufactured by Momentive Performance Materials Inc.) was added, and the resulting mixture was stirred for 1.5 minutes with a planetary centrifugal mixer. Thereafter, 11 parts by mass of isophorone diisocyanate (Desmodur I, produced by Sumika Bayer Urethane Co., Ltd.) was added, and the resulting mixture was stirred for 3 minutes with a planetary centrifugal mixer and defoamed for 1.5 minutes. Thereafter, the resulting mixture was injected into the forming apparatus 30 shown in FIG. 5, and cross-linked/cured under conditions of a temperature of 110° C. and a retention time of 30 minutes in a furnace while being carried in a state of being sandwiched between protection films to obtain a rolled sheet with protection films, which has a predetermined thickness. Thereafter, the obtained sheet was cross-linked for 720 minutes in a furnace adjusted to 80° C. to prepare a dielectric layer which was composed of an elastomer composition containing an ester-based urethane elastomer and has a layer thickness of 50 μm.

The elongation at break (%), the volume resistivity (Ωcm) and the relative permittivity of the prepared dielectric layer were measured in the same manner as in Preparation Example 1, and consequently the elongation at break (%) was 388%, the volume resistivity was $1.20 \times 10^9$ Ωcm, and the relative permittivity was 7.1.

Preparation Example 3: Dielectric Layer Made of Ether-Based Urethane Elastomer

Hundred parts by mass of polypropylene glycol (PREMINOL S3003, produced by ASAHI GLASS CO., LTD.) and 20 parts by mass of bis(2-ethylhexyl) phthalate (DOP, produced by Godo Co., Ltd.) were weighed, and stirred/mixed at a rotational speed of 2000 rpm for 3 minutes by using a planetary centrifugal mixer (manufactured by THINKY CORPORATION). Next, to the resulting mixture, 0.07 parts by mass of a catalyst (Fomrez Catalyst UL-28, manufactured by Momentive Performance Materials Inc.) was added, and the resulting mixture was stirred for 1.5 minutes with a planetary centrifugal mixer. Thereafter, 11 parts by mass of isophorone diisocyanate (Desmodur I, produced by Sumika Bayer Urethane Co., Ltd.) was added, and the resulting mixture was stirred for 3 minutes with a planetary centrifugal mixer, defoamed for 1.5 minutes, and then the resulting mixture was injected into the forming apparatus 30 shown in FIG. 5, and cross-linked/cured under conditions of a temperature of 110° C. and a retention time of 30 minutes in a furnace while being carried in a state of being sandwiched between protection films to obtain a rolled sheet with protection films, which has a predetermined thickness. Thereafter, the obtained sheet was cross-linked for 720 minutes in a furnace adjusted to 80° C. to prepare a dielectric layer which was composed of an elastomer composition containing an ether-based urethane elastomer and has a layer thickness of 50 μm.

The elongation at break (%), the volume resistivity (Ωcm) and the relative permittivity of the prepared dielectric layer were measured in the same manner as in Preparation Example 1, and consequently the elongation at break (%) was 280%, the volume resistivity was $2.58 \times 10^{11}$ Ωcm, and the relative permittivity was 5.2.

Preparation Example 4: Dielectric Layer Made of EPDM

To 100 parts by mass of EPDM (ESPLENE 600F produced by Sumitomo Chemical Co., Ltd.), 1.1 parts by mass of PERCUMYL D (produced by NOF CORPORATION) was added as a peroxide crosslinking agent, and the resulting mixture was kneaded with a roller to obtain a raw rubber. The raw rubber was press-formed at 160° C. for 20 minutes to be cross-linked, and thereby, an EPDM dielectric layer having a thickness of 50 μm was prepared.

Preparation Example 5: Dielectric Layer Made of Silicone Rubber

To 100 parts by mass of Shin-Etsu Silicone two-component RTV rubber (KE-1414, produced by Shin-Etsu Chemical Co., Ltd.), 5 parts by mass of a crosslinking agent (CX-32-2077, produced by Shin-Etsu Chemical Co., Ltd.) was added, and the resulting mixture was stirred/mixed at a rotational speed of 2000 rpm for 90 seconds by using a planetary centrifugal mixer, and then defoamed at 2000 rpm revolving the planetary centrifugal mixer. The resulting mixture was injected into the forming apparatus 30 and formed into a sheet by the same method as in Preparation Example 1 except for changing the conditions in a furnace to a temperature of 23° C. and a retention time of 30 minutes in a furnace. Thereafter, the sheet was left standing at room temperature for a day to prepare a dielectric layer of 50 μm in thickness, made of a silicone rubber.

<Preparation of Electrode Layer Material>

Preparation Example 1

To 280 ml of toluene, 30 mg of Super-Growth CNT (hereinafter, also referred to as "SGCNT") (median value of a fiber diameter: about 3 nm, growth length: 500 to 700 μm, aspect ratio: about 100000, carbon purity: 99.9%, provided by National Institute of Advanced Industrial Science and Technology) was added as carbon nanotubes, and the resulting mixture was subjected to wet-dispersion treatment by using a jet mill (Nano Jet Pal JN10-SP003, manufactured by JOKOH CO., LTD.) to obtain an application liquid (A-1) for formation of an electrode layer.

In addition, the term growth length of carbon nanotubes refers to a height of a forest growing on a growth substrate in preparing carbon nanotubes.

Preparation Example 2

An application liquid (A-2) for formation of an electrode layer was obtained in the same manner as in Preparation Example 1 except for using VGCF-X (length: 3 μm, aspect ratio: about 200, carbon purity: 95% or more, registered trademark, manufactured by Showa Denko K.K.) as carbon nanotubes.

Evaluation 1: Measurement of Changes in Electric Resistance Against Cyclic Deforming The dielectric layer prepared in the above Preparation Example 1 was cut into a piece with a size of 8 cm wide×8 cm long, and the application liquid (A-1) for formation of an electrode layer or the application liquid (A-2) for formation of an electrode layer was applied in a rectangle onto a center portion of one surface of the cut dielectric layer by using an air brush, and dried at 80° C. for 1 hour to form a dielectric layer of 20 mm wide and 50 mm long, and thereby an evaluation sample 1 (using the application liquid (A-1) for formation of an electrode layer) and an evaluation sample 2 (application liquid (A-2) for formation of an electrode layer) were prepared.

Thereafter, on each evaluation sample, the elongation deformation in which the sensor sheet was stretched by 100% in a direction of one-axis was repeated and electric resistance between both ends of the rectangular electrode was measured. That is, at first, the sensor sheet was stretched by 100% in a direction of one-axis once to add a hysteresis of deformation to the sheet, and this procedure was repeated, and the changes in electric resistance were measured.

Figure 6:
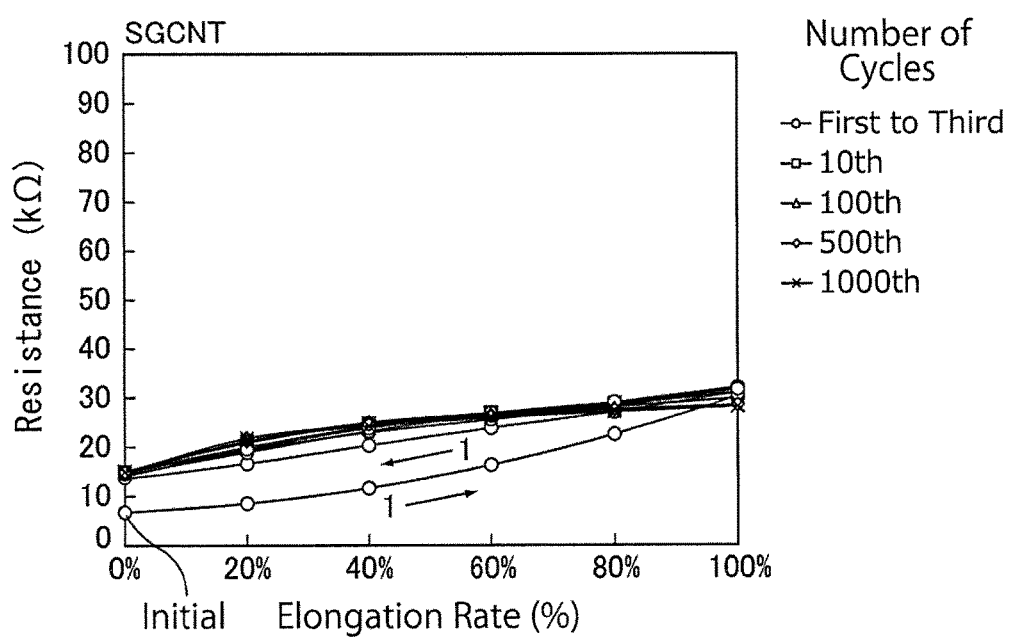
FIG. 6 is a graph showing measurement results of performing Evaluation 1: Measurement of Changes in Electric Resistance against Cyclic Deforming.
Figure 7:
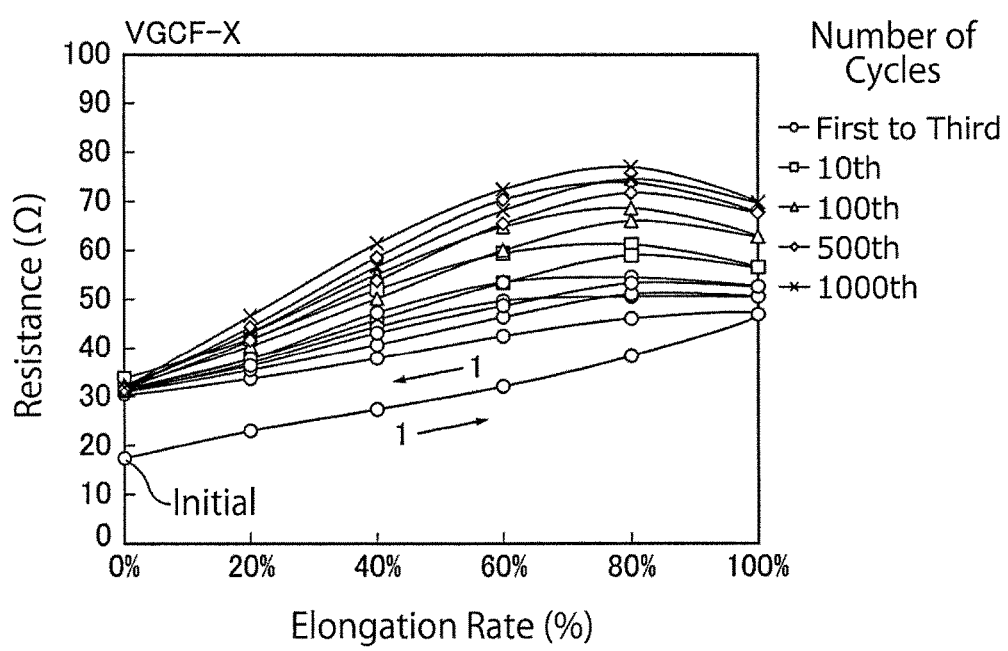
FIG. 7 is a graph showing measurement results of performing Evaluation 1: Measurement of Changes in Electric Resistance against Cyclic Deforming.

The measurement results of the evaluation samples 1 and 2 are shown in FIGS. 6 and 7, respectively.

It is assumed that the smaller an increase of electric resistance is, the less electric conductivity is reduced, and the better the durability for cyclic deforming is.

Here, in FIGS. 6 and 7, the lowest line in each drawing represents the change in electric resistance in stretching the sensor sheet by 100% (in an outward process) in a direction of one-axis at the first time, and another line (an upper line), which extends from a point representing an electric resistance value at the time of an elongation rate of 100%, represents the change in electric resistance in returning from the elongation rate of 100% to an elongation rate of 0% (in a return process) at the first time. The outward process and the return process are combined into one first cycle. Similarly, two lines, which extend from a point where a resistance value at the time of an elongation rate 100% is the second lowest, represent the change in electric resistance in a second cycle, and a lower line of these two lines represents the change in electric resistance in the outward process in the second cycle and an upper line represents the change in electric resistance in the return process in the second cycle. The changes in electric resistance in the third or more cycles are similarly shown in FIGS. 6 and 7.

It is understood from the results shown in FIGS. 6 and 7 that when using VGCF-X having a short average length as carbon nanotubes, electric resistance tends to increase with increase of the number of cycles of elongation by 100%, and on the other hand when using SGCNT having a long average length as carbon nanotubes, changes in electric resistance is small and electric resistance is kept constant even when the number of cycles of elongation by 100% increases, and it becomes clear that the latter is superior in durability to the former.

Evaluation 2: Measurement of Changes in Capacitance Against Deformation of Sensor Sheet Sensor Sheet 1 Example 1

The application liquid (A-1) for formation of an electrode layer was applied in a rectangle onto the obverse surface of the dielectric layer made of a urethane elastomer prepared in Preparation Example 1 by using an air brush, and dried to form top electrode layers. The top electrode layers are rectangular electrode layers arranged in parallel to one another, and five rectangular electrode layers having an average thickness of about 1 µm, a width of 10 mm and a length of 100 mm were formed at 5 mm intervals. Subsequently, the application liquid (A-1) for formation of an electrode layer was applied onto the reverse surface of the dielectric layer so as to be orthogonal to the top electrode layers to form bottom electrode layers in the same manner. Thereafter, both ends of these rectangular electrode layers were reinforced by a copper foil having a thickness of 0.1 mm, and leads of external conducting wires (top conducting wires and bottom conducting wires) were connected by screw clamp to form a sensor sheet 1.

Sensor Sheet 21 Comparative Example 1

A sensor sheet 21 was prepared in the same manner as in Example 1 except for using the dielectric layer made of EPDM prepared in Preparation Example 4 as a dielectric layer.

Figure 8:
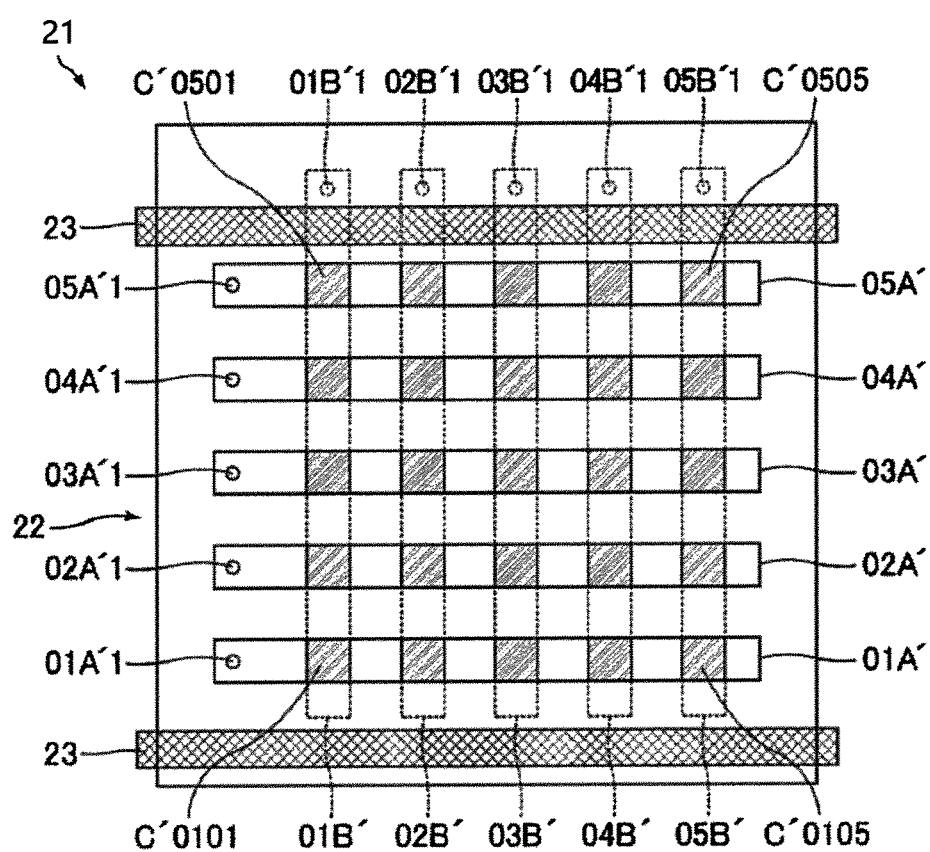
FIG. 8 is a schematic view for explaining a sensor sheet used in <Measurement of Changes in Capacitance against Deformation of Sensor Sheet> in Examples.

Each of the sensor sheets 1 and 21 was held at its two sides by a resin frame 23, as shown in FIG. 8, and the sheet between frames was stretched by 100% in a direction of one-axis and this was repeated, and the change in capacitance was measured. In addition, in FIG. 8, 01A' to 05A' indicate top electrode layers, 01B' to 05B' indicate bottom electrode layers, 01A'1 to 05A'1 indicate top connecting portions, 01B'1 to 05B'1 indicate bottom connecting portions, C'0101 to C'0505 indicate detection portions, and 22 indicates a dielectric layer made of an elastomer.

Figure 9:
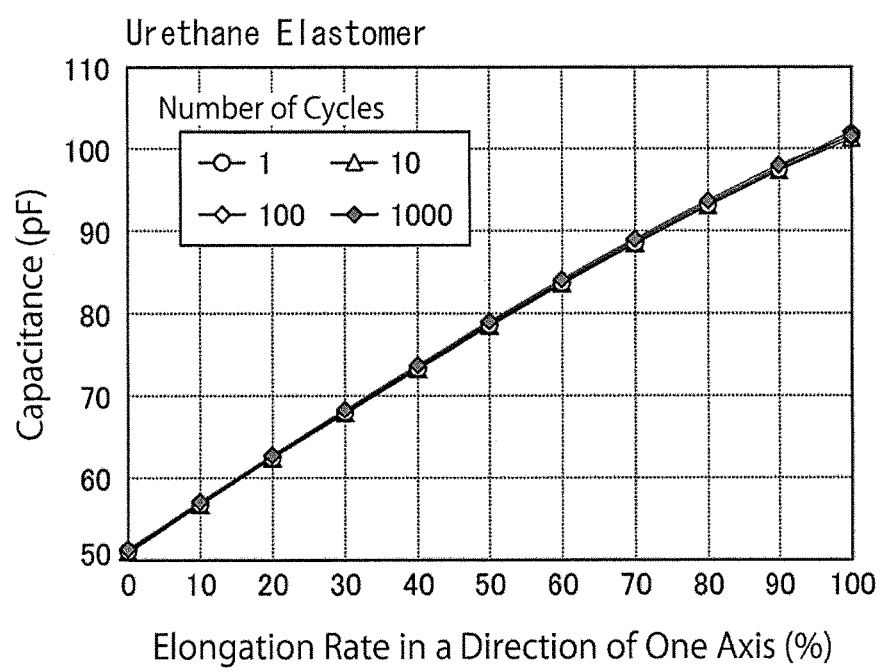
FIG. 9 is a graph showing measurement results of performing Evaluation 2: Measurement of Changes in Capacitance against Deformation of Sensor Sheet.
Figure 10:
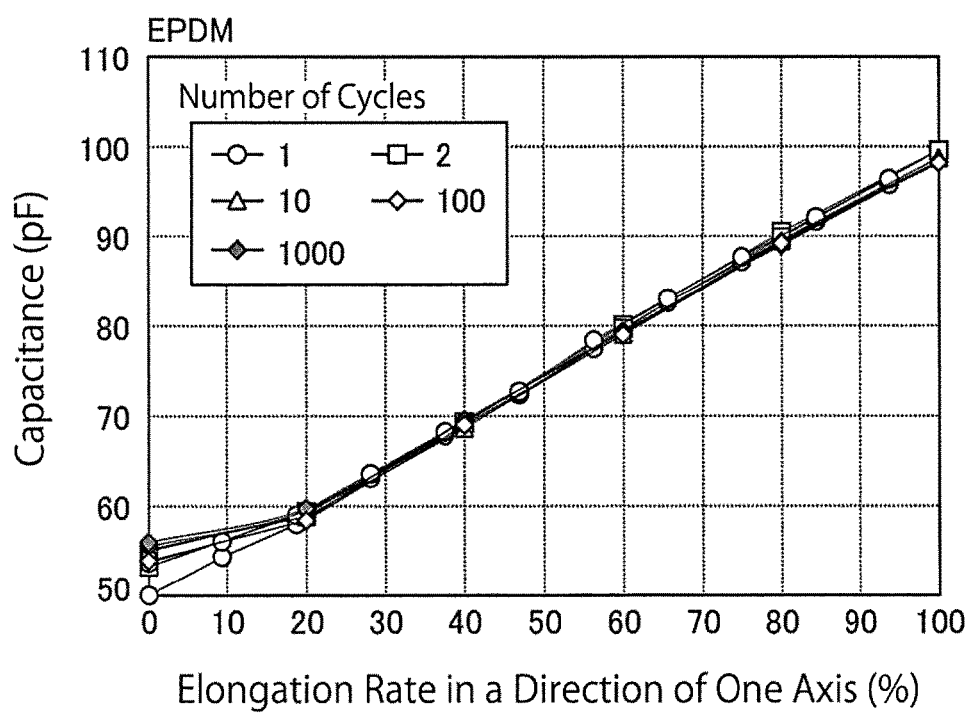
FIG. 10 is a graph showing measurement results of performing Evaluation 2: Measurement of Changes in Capacitance against Deformation of Sensor Sheet.

Measurement results are shown in Table 1 and an average capacitance of 25 detection portions was plotted with respect to an elongation rate in the elongation in a direction of one axis. The measurement results of the sensor sheet 1 are shown in FIG. 9 and the measurement results of the sensor sheet 21 are shown in FIG. 10.

The capacitance was measured by using an LCR meter (LCR HiTESTER 3522-50 manufactured by HIOKI E.E. CORPORATION).

TABLE 1

| Number of Stretches | EPDM Rubber (Sensor Sheet 21) | | Urethane Elastomer (Sensor Sheet 1) | |
|---|---|---|---|---|
| | Steady | Elongation by 100% | Steady | Elongation by 100% |
| 1 | 50 | 95.8 | 51.1 | 101.6 |
| 10 | 55.1 | 98.7 | 51 | 101.3 |
| 100 | 53.8 | 98.2 | 51.2 | 102 |
| 1000 | 55.5 | 98.4 | 51.3 | 101.5 |
| Average | 53.6 | 97.8 | 51.2 | 101.6 |
| Standard Deviation | 2.504 | 1.326 | 0.147 | 0.294 |

It becomes clear from the results in Table 1 and FIGS. 9 and 10 that while the capacitance of the sensor sheet 1 (Example 1) increases almost linearly from the steady state to the state of elongation by 100%, in the sensor sheet 21 (Comparative Example 1), the capacitance at the steady state increases with an increase of the number of cycles.

It becomes clear from this that the capacitive sensor sheet having the dielectric layer made of a urethane elastomer is excellent in the measurement accuracy in measuring repeatedly.

In addition, it becomes clear that the gradual increase of the capacitance at the steady state in the sensor sheet 21 having the dielectric layer made of EPDM is attributable to large permanent strain (permanent elongation) of EPDM.

Further, four sides of the sensor sheet 1 were fixed by a rigid frame, and two locations of the sensor sheet 1 were pushed with a glass rod to be warped, and the capacitance at each detection portion was detected separately. As a result of this, the distribution of strain due to elastic deformation within the sensor sheet 1 could be measured. The distribution of strain detected is shown in FIG. 11.

Figure 11:
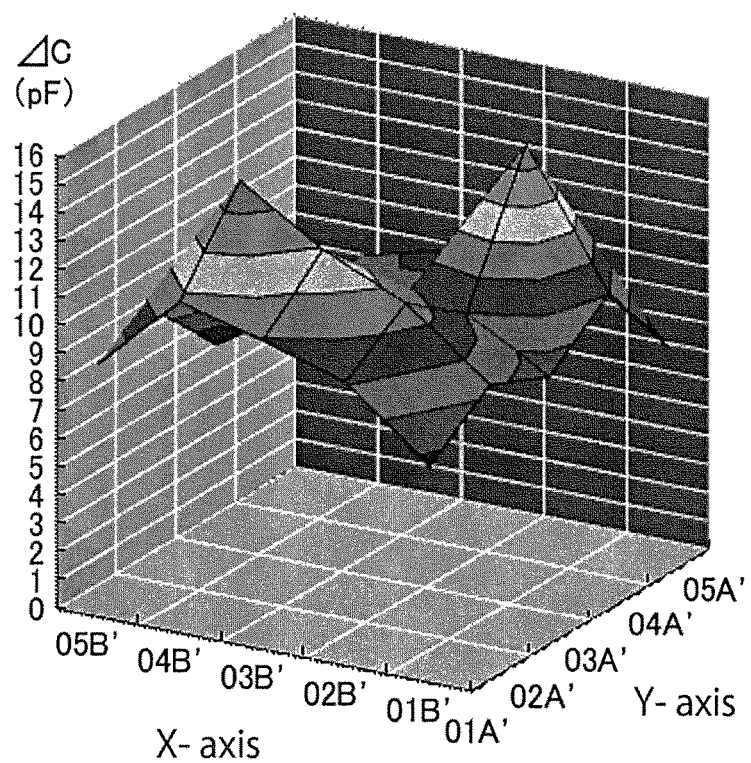
FIG. 11 is a three-dimensional graph showing a distribution of the strain due to elastic deformation detected by a sensor sheet 1.

FIG. 11 is a three-dimensional graph showing a distribution of the strain due to elastic deformation detected by a sensor sheet 1.

Evaluation 3: Adhesion Between Dielectric Layer and Electrode Layer

The application liquid (A-1) for formation of an electrode layer was applied in a rectangle onto one surfaces of the dielectric layers prepared in Preparation Examples 1 to 3 and 5 by using an air brush, and dried at 80° C. for 1 hour to form electrode layers of 10 mm wide, and thereby evaluation samples were prepared.

Thereafter, a masking tape (produced by NITO DENKO CORPORATION, Masking Tape No. 720) was stuck to the electrode layer (SGCNT film) and then peeled, and states of the electrode layer before sticking and after peeling were visually observed.

Consequently, in the evaluation samples using the dielectric layers (dielectric layers made of a urethane elastomer) of Preparation Examples 1 to 3, the electrode layers caused delamination, and on the other hand, in the evaluation sample using the dielectric layer (dielectric layer made of a silicone rubber) of Preparation Example 5, the electrode layer was peeled off at an interface between the electrode layer and the dielectric layer, and it becomes clear that the dielectric layer made of a urethane elastomer is excellent in adhesion to the electrode layer formed by using SGCNT.

Figure 12:
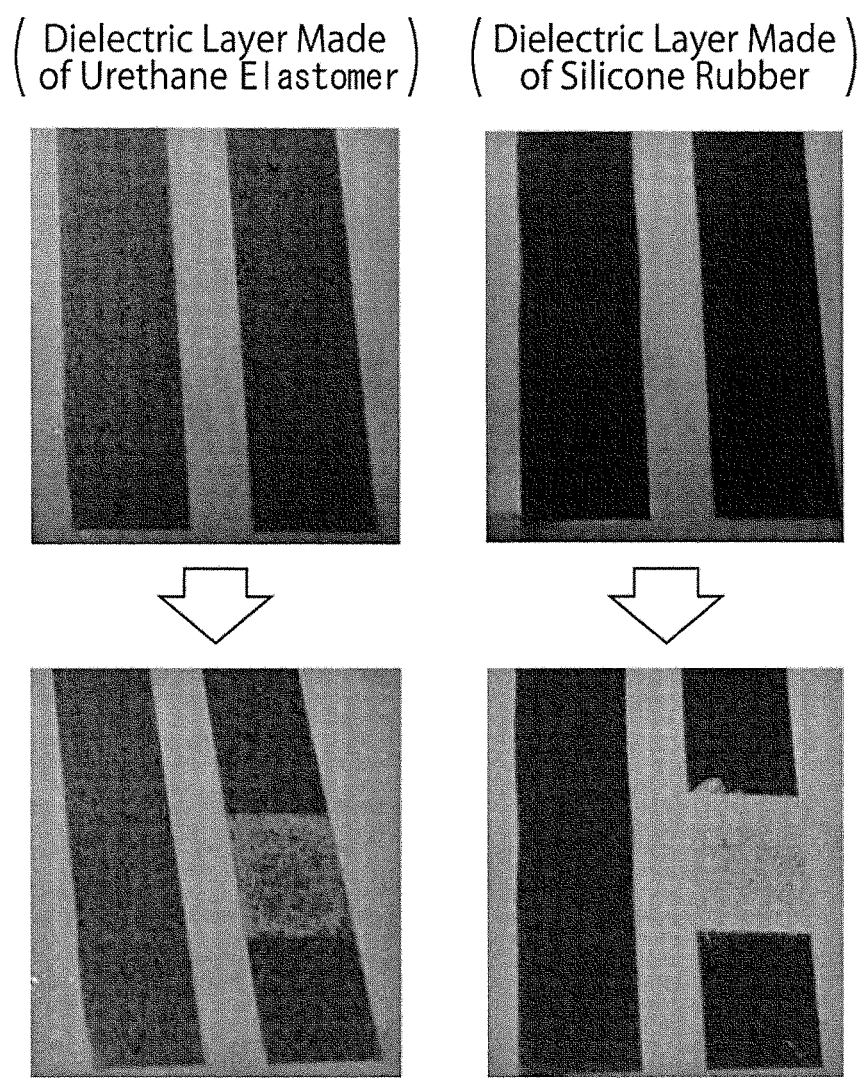
FIG. 12 is a photograph showing evaluation results of evaluating Evaluation 3: Adhesion between Dielectric Layer and Electrode Layer.

In addition, the evaluation results (the state of the electrode layer before and after sticking the masking tape) of the evaluation sample using the dielectric layer (dielectric layer made of a urethane elastomer) of Preparation Example 1, and the evaluation results of the evaluation sample using the dielectric layer (dielectric layer made of a silicone rubber) of Preparation Example 5, are shown in FIG. 12.

INDUSTRIAL APPLICABILITY

The capacitive sensor sheet of the embodiment of the present invention can be suitably used as a capacitive sensor sheet for measuring at least one of the amount of strain due to elastic deformation and the distribution of strain due to elastic deformation.

The capacitive sensor using the capacitive sensor sheet of the embodiment of the present invention can be used, for example, as a sensor for tracing a shape of a soft article or as a sensor for measuring the motion of the measuring object. More specifically, the sensor can measure (detect), for example, deformation of a sole inner due to the bottom of the foot or deformation of a seat cushion due to hips.

The capacitive sensor can also be used, for example, as an input interface for a touch panel.

Further, the capacitive sensor of the embodiment of the present invention can also be used for measurement at a light-shielded site, which cannot be measured by an optical motion capture of an existing sensor.

REFERENCE SIGNS LIST 1, 1', 44: CAPACITIVE SENSOR SHEET
2, 2': DIELECTRIC LAYER
01A1 to 16A1: TOP CONNECTING PORTION
01A to 16A, 01D to 16D: TOP ELECTRODE LAYER
01B1 to 16B1: BOTTOM CONNECTING PORTION
01B to 16B, 01E to 16E: BOTTOM ELECTRODE LAYER
C0101 to C1616, F0101 to F1616: DETECTION PORTION
01d to 16d: TOP CONDUCTING WIRE
01e to 16e: BOTTOM CONDUCTING WIRE
21: CAPACITIVE SENSOR SHEET
22: DIELECTRIC LAYER MADE OF ELASTOMER
23: RESIN FRAME
01A' to 05A': TOP ELECTRODE LAYER
01A1 to 05A'1: TOP CONNECTING PORTION
01B' to 05B': BOTTOM ELECTRODE LAYER
01B1 to 05B1: BOTTOM CONNECTING PORTION
C'0101 to C'0505: DETECTION PORTION
30: FORMING APPARATUS
44A: TOP OVERCOAT LAYER
44B: BOTTOM OVERCOAT LAYER
101: CAPACITIVE SENSOR
102, 103: EXTERNAL CONDUCTING WIRE
104: MEASUREMENT INSTRUMENT

The invention claimed is:

1. A capacitive sensor sheet used for measuring at least one of an amount of strain due to elastic deformation and a distribution of strain due to elastic deformation,
the capacitive sensor sheet comprising:
a dielectric layer;
a top electrode layer that is laminated on the obverse surface of the dielectric layer and includes first rectangular strips arranged in parallel; and
a bottom electrode layer that is laminated on the reverse surface of the dielectric layer and includes second rectangular strips that are arranged in parallel and intersect with the first rectangular strips at right angles as viewed from the obverse-reverse direction, wherein
the dielectric layer is composed of an elastomer composition containing a urethane elastomer,
a hardness of the dielectric layer is 0 to 30° in terms of the hardness using a type A durometer, or 10 to 55° in terms of the hardness using a type C durometer,
each of the top electrode layer and the bottom electrode layer is composed of an electroconductive composition containing carbon nanotubes,
a change in capacitance of the sensor sheet occurs when a surface area of at least one of the electrode layers is elongated in a direction along a surface of the sensor sheet, and
the dielectric layer is elongated in the direction along the surface of the sensor sheet when the at least one of the electrode layers is elongated.

2. The capacitive sensor sheet according to claim 1, wherein an elongation rate which the capacitive sensor sheet can endure in uniaxial tensile is 30% or more.

3. The capacitive sensor sheet according to claim 1, wherein the urethane elastomer is an olefin-based urethane elastomer.

4. The capacitive sensor sheet according to claim 1, wherein the urethane elastomer is an ester-based urethane elastomer.

5. The capacitive sensor sheet according to claim 1, wherein the urethane elastomer is an ether-based urethane elastomer.

6. The capacitive sensor sheet according to claim 1, wherein the carbon nanotubes have an average length of 100 μm or more.

7. The capacitive sensor sheet according to claim 1, wherein the carbon nanotubes have a purity of 99% by weight or more.

8. The capacitive sensor sheet according to claim 1, wherein an average thicknesses of each of the top electrode layer and the bottom electrode layer is 0.1 to 10 μm.

9. A capacitive sensor used for measuring at least one of the amount of strain due to elastic deformation and the distribution of strain due to elastic deformation,
the capacitive sensor comprising:
a capacitive sensor sheet comprising:
a dielectric layer;
a top electrode layer that is laminated on the obverse surface of the dielectric layer and includes first rectangular strips arranged in parallel; and
a bottom electrode layer that is laminated on the reverse surface of the dielectric layer and includes second rectangular strips that are arranged in parallel and intersect with the first rectangular strips at right angles as viewed from the obverse-reverse direction, wherein
the dielectric layer is composed of an elastomer composition containing a urethane elastomer,
a hardness of the dielectric layer is 0 to 30° in terms of the hardness using a type A durometer, or 10 to 55° in terms of the hardness using a type C durometer,
each of the top electrode layer and the bottom electrode layer is composed of an electroconductive composition containing carbon nanotubes,
a change in capacitance of the sensor sheet occurs when a surface area of at least one of the electrode layers is elongated in a direction along a surface of the sensor sheet, and
the dielectric layer is elongated in the direction along the surface of the sensor sheet when the at least one of the electrode layers is elongated;
a measurement instrument; and
external conducting wires by which each of the top electrode layer and the bottom electrode layer is connected to the measurement instrument.

10. A capacitive sensor sheet used for measuring an amount of strain due to elastic deformation,
the capacitive sensor sheet comprising:
a dielectric layer;
a top electrode layer laminated on the obverse surface of the dielectric layer; and
a bottom electrode layer laminated on the reverse surface of the dielectric layer, wherein
the dielectric layer is composed of an elastomer composition containing a urethane elastomer, a hardness of the dielectric layer is 0 to 30° in terms of the hardness using a type A durometer, or 10 to 55° in terms of the hardness using a type C durometer, each of the top electrode layer and the bottom electrode layer is composed of an electroconductive composition containing carbon nanotubes, a portion where the top electrode layer and the bottom electrode layer intersect as viewed from the obverse-reverse direction forms a detection portion, a change in capacitance of the sensor sheet occurs when a surface area of at least one of the electrode layers is elongated in a direction along a surface of the sensor sheet, and the dielectric layer is elongated in the direction along the surface of the sensor sheet when the at least one of the electrode layers is elongated.

* * * * *